United States Patent [19]

McRowe et al.

[11] Patent Number: 4,507,414
[45] Date of Patent: Mar. 26, 1985

[54] SMOKE RETARDANT VINYL HALIDE POLYMER COMPOSITIONS

[75] Inventors: Arthur W. McRowe, Akron; Randall J. Brown, Sheffield Lake, both of Ohio

[73] Assignee: The B. F. Goodrich Company, Akron, Ohio

[21] Appl. No.: 378,377

[22] Filed: May 14, 1982

[51] Int. Cl.$^3$ .......................... C08K 5/09; C08K 3/26
[52] U.S. Cl. .................................. 524/100; 524/398; 524/425; 524/567
[58] Field of Search ................ 524/100, 398, 425, 567

[56] References Cited

U.S. PATENT DOCUMENTS

| Re. 27,121 | 4/1971 | Canarios | 524/433 |
| 2,483,959 | 10/1949 | Baer | 524/433 |
| 4,053,453 | 10/1977 | McRowe et al. | 524/398 |
| 4,294,752 | 10/1981 | Silberberg | 524/567 |

OTHER PUBLICATIONS

Charles E. Hoke, "Compounding Flame Retardance into Plastics", SPE Journal, (May 1973), vol. 29, pp. 36–40.

Lally et al., "Stabilization of Polyvinyl Chloride", Modern Plastics, (Dec. 1949), pp. 111, 112, 114, 116, 156 to 162.

*Primary Examiner*—Veronica P. Hoke
*Attorney, Agent, or Firm*—J. Hughes Powell, Jr.; Alan A. Csontos

[57] ABSTRACT

Vinyl halide polymer compositions containing smoke retarding amounts of copper oxalate and an amine molybdate that form a carbonaceous char on burning do not exhibit char afterglow when such compositions also contain less than 20 weight parts of a Group IIA alkaline earth metal carbonate. Improved rigid vinyl halide polymer compositions, substantially free of liquid ester type plasticizers, also containing styrene copolymer process modifiers, copolymers of ethylene and vinyl acetate and graft copolymers of methacrylates, butadiene, and styrenes (MBS) polymers, are disclosed.

10 Claims, No Drawings

SMOKE RETARDANT VINYL HALIDE POLYMER COMPOSITIONS

BACKGROUND OF THE INVENTION

Most polymers will burn. However, vinyl chloride polymers are much better than most organic polymers for fire safety qualities. Polyvinyl chloride is inherently difficult to ignite. When ignited polyvinyl chloride burns only with difficulty compared with other polymers. Therefore, polyvinyl chloride has been widely used where fire safety is important. After ignitability and rate of burning, an important fire safety concern is that of smoke and gas emission when a polymer is forced to burn. U.S. Pat. No. 4,053,453 discloses rigid vinyl halide polymer compositions containing copper oxalate and amine molybdates that suppress smoke formation when such polymers burn. This combination reduces the evolution of flammible, organic pyrolysis products and increases the yield of carbonaceous char. This carbonaceous char will burn in a phenomenon known as "after-glow". It is desireous to decrease or eliminate the burning or after-glow of the char. This would decrease total calories (heat) released, oxygen consumption, production of carbon oxides and possible fire spread.

SUMMARY OF THE INVENTION

Vinyl halide polymer compositions containing smoke retarding amounts of copper oxalate and an amine molybdate that form a carbonaceous char on burning, are not subject to char after-glow when such compositions contain less than 20 weight parts of a Group IIA, of the Periodic Chart, alkaline earth metal carbonate.

DETAILED DESCRIPTION

The vinyl halide polymers used in this invention include homopolymers, copolymers and blends of homopolymers and/or copolymers. Useful vinyl halides include vinyl chloride and vinylidene chloride polymers that contain up to about 50% by weight of at least one other olefinically unsaturated monomer, more preferably at least one other vinylidene monomer (i.e., a monomer containing at least one terminal $CH_2=C<$ group per molecule) copolymerized therewith, even more preferably up to about 20% by weight of such monomers. Suitable comonomers include α-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norborene and dicyclopentadiene; vinyl esters and allyl esters such as vinyl acetate, vinyl chloroacetate, vinyl propionate, vinyl butyrate, vinyl laurate, vinyl benzoate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α,β- and γ-cyanopropyl acrylates and the like; olefinically unsaturated carboxylic acids and esters thereof, including α,β-olefinically unsaturated acids and esters thereof such as acrylic acid, methacrylic acid, ethacrylic acid, methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethooxyethyl acrylate, hexylthioethyl acrylate, methylmethacrylate, ethyl methacrylate, butyl methacrylate, glycidyl methacrylate and the like wherein the alkyl groups contain 1 to 12 carbon atoms, and including esters of maleic and fumaric acid and the like; amides of the, -olefinically unsaturated carboxylic acids such as acrylamide, methacrylamide, and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis(-haloalkyl)alkenyl phosphonates such as bis(-chloroethyl)vinyl phosphonate and the like.

A group of particularly useful comonomers include 1-olefins containing from 2 to 8 carbon atoms; vinyl esters and allyl esters; olefinically unsaturated carboxylic acids and esters thereof, especially, -olefinically unsaturated acids and esters thereof; esters of maleic and fumaric acid and the like; amides of, -olefinically unsaturated carboxylic acids; and vinylidene or vinyl chloride.

The term vinyl chloride polymer includes chlorinated and chlorosulfonated derivatives of the vinyl chloride polymers described hereinafter. Methods for chlorinating polyvinyl chloride (PVC) polymers are well known. U.S. Pat. Nos. 2,996,489 and 3,167,535 disclose chlorination in organic liquids; while U.S. Pat. No. 4,039,732 describes a gas phase chlorination process. Normally the PVC is chlorinated until it contains about 65 to 70 weight percent chlorine, although the chlorine content may be as high as about 73 percent, or lightly chlorinated, as desired. In any event, the compositions of this invention include chlorinated and chlorosulfonated vinyl chloride polymers compounded with copper oxalate, an amine molybdate, the alkaline earth metal carbonate.

These vinyl chloride polymers normally are high molecular weight polymers having a specific viscosity greater than 0.2 measured as a 0.4% solution in nitrobenzene.

The vinyl chloride polymers may be prepared by any method known to the art as by emulsion, suspenion, bulk or solution polymerization. The additive compounds may be mixed with the polymer emulsion, suspension, solution or bulk mass before monomer recovery and/or drying. More preferably the compounds are mixed with dry granular or powdered polymers. The polymers and compounds may be mixed thoroughly in granular or powdered form in apparatus such as a Henschel mixer or the like. Alternatively, this step may be eliminated and the mixing done while the polymer mass is fluxed, fused and masticated to homogeneity under fairly intensive shear in or on a mill or internal mixer apparatus having its metal surface in contact with the material. The vinyl chloride polymers may also be mixed with standard compounding ingredients known to those skilled in the art, including plasticizers, lubricants, stabilizers, fillers, colorants, processing aids, and the like.

The copper oxalate and amine molybdates are normally used in powder form in amounts greater than about 0.1 weight part total per 100 weight parts of vinyl halide polymer, more preferably from about 1 to about 20 total weight parts per 100 weight parts of vinyl chloride polymers. From about 1 to about 10 total weight parts is a very practical range providing a good balance of desirable properties in the compounds. The useful ratio of copper oxalate to amine molybdate is from about 1:10 to 10:1 on a weight basis. The copper oxalate and amine molybdate are readily mixed with the vinyl chloride polymers in powder form.

Any amine molybdate may be used. Typical amine molybdates are described in U.S. Pat. No. 4,053,453. Amine molybdates are typically produced by reacting an amine with MoO₃, molybdic acid or a molybdenum salt such as ammonium molybdate, ammonium dimolybdate, ammonium heptamolybdate (also known as ammonium paramolybdate), ammonium octamolybdate, sodium molybdate or the like. Excellent results have been obtained using ammonium dimolybdate, ammonium heptamolybdate, sodium molybdate, and the commercial "molybdic acid" which primarily consists of one or more ammonium molybdates.

Amines suitable for preparing the organoamine molybdates used in this invention may contain from 1 to 40 carbon atoms and from 1 to 10 primary, secondary or tertiary amine groups or a mixture thereof; more preferably from 1 to 20 carbon atoms and 1 to 4 primary amines or heterocyclic secondary amine groups. Examples of amines include aliphatic, alicyclic, aromatic and heterocyclic amines. Aliphatic amines include ethylamine, ethylenediamine, 1,2-propanediamine, 1,7-heptanediamine, 1,8-octanediamine, 1,10-decanediamine, 1,12-dodecanediamine and the like. Also, aliphatic polyamines such as diethylenetriamine, triethylenetetramine, tetraethylenepentamine, bis(hexamethylene)triamine, 3,3'-iminobispropylamine, quanidine carbonate, and the like. Other suitable amines include alicyclic diamines and polyamines such as 1,2-diaminocyclohexane, 2',4-diamino-1-propyl-4-methylcyclohexane, and the like; aromatic amines as aniline, and maphthylamine; and heterocyclic amines such as melamine, N,N-dimethylaniline, pyridine, piperazine; hexamethylenetetraaime; 2,2,3-trimethyl decahydroquinoline, 2,4,6-tri(-morpholino)-1,3,5-triazine; and N-(aminoalkyl)-piperazines wherein each alkyl group contains from 1 to 12 carbon atoms, more preferably 1 to 6 carbon atoms, such as N-(2-aminoethyl)piperazine, and the like. Examples of suitable polymeric amines include polyethyleneimine, polyvinylpyridine, polyvinyl pyrrolidine, and poly(2,2,4-trimethyl-1,2-dihydroquin-olyl). Excellent results are obtained using melamine, piperazine, and alkyl amines wherein the alkyl contains 1 to 8 carbon atoms.

Useful melamine and substituted melamines have the formula

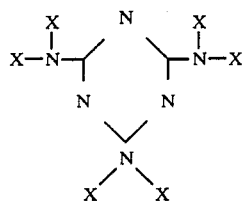

wherein X is hydrogen or an alkyl, alicyclic, aralkyl, alkaryl, aryl or heterocyclic group containing from 1 to 10 atoms of C, O, S and/or N. Two X's on each of one or more nitrogen atoms may also be joined together to form a heterocyclic ring such as a morpholino group in 2,4,6-tri(morpholino)-1,3,5-triazine. Other examples of suitable substituted melamines include N,N',N''-hexaethylmelamine; 2-anilino-4-(2',4'-dimethylanilino)-6-piperidino-1,3,5-triazine; and 2,4,6-tri-(N-methylanilino)-1,3,5-triazine. The amine molybdate normally contains from about 1 to 2 moles of molybdenum per mole of amine.

The amine molybdates used in this invention may be in the form of polycrystalline or amorphous fine powders. The amine molybdate and copper oxide may have an average particle size from about 0.01 to about 800 microns, more preferably from about 0.1 to about 200 microns, and even more preferably from about 0.1 to about 50 microns. Supports such as $SiO_2$, $Al_2O_3$ and the like may be used for the smoke retardant additives.

The alkaline earth metal carbonate, Group IIA of the Periodic Chart, includes for example calcium carbonate, magnesium carbonate, strontium carbonate and barium carbonate. The amount of carbonate used is less than 100 weight parts each per one hundred weight parts of vinyl halide polymer, for example, one to less than twenty weight parts. A useful range is about five to less than fifteen weight parts. Use of about 5 to about 10 weight parts provides a good balance of desirable properties in the composition. The carbonates, as calcium carbonate, are readily incorporated into the vinyl halide composition by any of the methods known and used by those skilled in the art. The calcium carbonate is used in finely divided form, for example, particle sizes from about 0.005 to about 200 microns. The additives may be added to the compounds on a mill, by powder mixing, in an internal mixer and the like.

Particularly useful rigid vinyl halide polymer compositions, substantially free of liquid ester type plasticizers, and containing the smoke suppressing copper oxalate and metal carbonate, also contain styrene copolymer processing aids, and optionally, copolymers of ethylene and vinyl acetate and/or graft copolymers of alkyl methacrylates, butadiene and styrenes (MBS) polymers. These later materials contribute to impact improvement.

The styrene copolymer processing aid may be made from monomers containing as two essential monomers, 50 to 90% by weight of styrene or a nuclear or alpha-substituted styrene such as chloro, alkyl, and alkoxy styrenes such as chlorostyrene, vinyl toluene, α-methyl styrene, methoxystyrene and the like, with from 10 to 50% by weight of an acrylicnitrile such as acrylonitrile, methacrylonitrile, ethacrylonitrile, and the like. Other vinyllidene monomers containing at least one terminal $CH_2<$ group may be included in amounts up to about 20% by weight of the total monomers. These polymers are described in U.S. Pat. No. 2,646,417. The styrene-alkacrylate copolymers normally contain as two essential monomers, from 75 to 25 weight percent of styrene, a nuclear or α-substituted derivative such as chlorostyrene, vinyl toluene, α-methyl styrene, methoxystyrene and the like, and from 25 to 75 weight percent of an aliphatic alicyclic or aromatic methacrylate. Useful are alkyl methacrylates and ethacrylates wherein the alkyl group contains 1 to 8 carbon atoms, alicyclic methacrylates such as cyclohexyl methacrylate and the like, other vinylidene monomers containing at least terminal $CH_2<$ group in amounts up to 20 weight percent may be included. Normally the copolymer contains 60 to 40 weight percent styrene and 40 to 60 weight percent methyl methacrylate. Acrylate materials also may be used such as styrene copolymers of methyl methacrylate and ethyl methacrylate substituted for the styrene nitrile copolymers. These polymers generally have molecular weights above about 40,000. The amounts used are 1 to 10 weight parts per 100 weight parts of vinyl chloride polymer.

The MBS impact modifiers are alkyl alkacrylate equivalents of ABS (acrylonitrile, butadiene and styrene) graft polymers and are well known. These materials are readily prepared for example by grafting methyl methacrylate and styrene onto a butadiene polymer substrate, which may be a copolymer of butadiene and a minor proportion of styrene or acrylonitrile. Other styrene derivatives such as α-methyl styrene, chlorostyrene, methoxy styrene and the like may be employed and other alkyl alkacrylates such as methyl methacrylate, ethyl methacrylate, methyl ethacrylate, butyl ethacrylate, and the like may be employed. Normally these butadiene polymers contain greater than 50 weight parts of butadiene-1,3 with the remainder being from 0 weight parts to about 50 weight parts of a vinylidene monomer containing at least one terminal $CH_2 <$ group, for example, 10 to 50 parts of styrene. At least part of the styrene and the alkyl alkacrylate are grafted onto the butadiene polymer substrate. Proportions of monomer can be from about 20 to 90% of methyl methacrylate and styrene with 80 to 10 parts of the diene substrate. The styrene is normally is the predominant monomer. More usually, the proportions are 30 to 60 of methyl methacrylate and styrene and 70 to 40 parts of butadiene polymer. A typical formulation would be polymerizing 20 parts of methyl methacrylate and 20 parts of styrene onto 60 parts of a copolymer of 75 parts of butadiene polymerized with 25 parts of styrene. Cross-linking agents may be used in either the substrate or in the graft polymerization stage, and such materials include, for example, diallyl acrylate, divinyl benzene and other well known difunctional cross-linking agents normally in amounts up to 2 weight parts per 100 of the other monomers. The MBS polymers are generally a mixture of the rubber particles dispersed in a styrene/methyl methacrylate matrix, the styrene and methyl methacrylate being grafted onto the elastomeric butadiene polymer substrate.

The ethylene-vinyl acetate (EVA) copolymers are well known and such copolymers prepared by methods known to those skilled in the art to contain from 5 to 60% of vinyl acetate copolymerized with ethylene.

The EVA and MBS may be advantageously used together. As to the proportion of EVA/MBS, excellent results have been obtained at 8:4, 7:3 and 6:2. Preferably of the two components there is used 60 to 80 weight percent EVA and 40 to 20 weight percent of MBS. Although improvement is observed when the mixture contains greater than 50 percent EVA, amounts larger than 90 weight percent are not desired. The total amount of the two modifiers used is an amount of at least 3 up to 15 weight parts per 100 weight parts of vinyl halide polymer, more preferably 6 to 12 weight parts. The process modifiers and impact improvers are readily mixed with the vinyl halide polymers, copper oxalate and amine molybdate, the IIA metal carbonate by any of those techniques well known to those skilled in the art.

In testing for flame retardants the following procedure is used.

Smoke retardation may be measured using as NBS Smoke Chamber according to procedures described by Groas et al, "Method For Measuring Smoke from Burning Materials", *Symposium on Fire Test Methods-Restraint and Smoke* 1966, ASTM STP 422, pp. 166–204. Maximum smoke density $(D_m)$ is a dimensionless number and has the advantage of representing a smoke density independent of chamber volume, specimen size of photometer path length, provided a consistent dimensional system is used. Maximum rate of smoke generation $(R_m)$ is defined in units of $\text{min.}^{-1}$. Precent smoke reduction is calculated using this equation:

$$\frac{D_m/\text{g of control} - D_m/\text{g of sample}}{D_m/\text{g of control}} \times 100$$

The term "$D_m/\text{g}$" means maximum smoke density per gram of sample. $D_m$ and other aspects of the physical optics of light transmission through smoke are discussed fully in the above ASTM publication.

In the following examples, there is reported the $D_m/\text{g}$, maximum optical density/gram sample observed with a vertical light path in the National Bureau of Smoke Chamber (NBS). $D_m$ is maximum optical density according to Gross. The NBS smoke chamber and its use are described by Gross et al in fire test methods ASTM STP 422, 1967, Pages 166–206. The NBS $D_m/\text{g}$ smoke numbers reported are in the flaming or nonflaming mode. The $D_s$ values are instantaneous smoke density at a given time such as 90 seconds and 4 minutes. Refer to ASTM E662-79.

To demonstrate the practice of the invention and various embodiments thereof, a series of compounds were prepared using the following formulation: 100 weight parts of poly(vinylchloride) having an inherent viscosity (IV) of 0.9 measured by ASTM D1243-66; 2 weight parts of a copolymer of 78 weight percent styrene and 22 weight percent acrylonitrile, 1 weight part of a wax ester lubricant having an ASTM D566/49 drop point of 100°–105° C., a density of 20° C. of 1.01 to 1.03 and an ASTM D1387/55T saponification value of 100115 (American Hoechst), 1 weight part of saturated fatty acid ester lubricant having a drop point of 122°–125° F., viscosity of 185 cp at 140° F., specific gravity of 0.921 at 104° F. and refractive index of 1.450 to 1.453 (Henkel, Inc.); 4 weight parts of dibutyltin-bis-octylthioglycollate, 6 weight parts titanium dioxide pigment, 2 weight parts of copper oxalate, 2 weight parts of melamine molybdate, 6 weight parts of a copolymer of ethylene/vinyl acetate (EVA) containing 45% vinyl acetate, and 2 weight parts of MBS containing 20 weight parts each of styrene and methyl methacrylate grafted onto a copolymer of 75 weight parts butadiene-1,3 and 25 weight parts of styrene. Three compounds were prepared with 0, 5, 10 and 30 weight parts of calcium carbonate. A masterbatch of all the compound ingredients except calcium carbonate was first prepared, and there was then added to portions of the masterbatch, on a mill, 5, 10 and 30 weight parts of calcium carbonate. The physical properties obtained are set forth in the Table. D and B representing the typing failure, D-ductile and B-brittle.

TABLE

| Compound | 1 | 2 | 3 | 4 |
|---|---|---|---|---|
| CaCO$_3$ - wt. parts | 0 | 5 | 10 | 30 |
| VHIT* 264 ft. lbs. | D | D | D | B |
| VHIT** | 2.98/D | 2.8/D | 2.5/D | 1.89/B |

TABLE-continued

| Compound | 1 | 2 | 3 | 4 |
|---|---|---|---|---|
| Izod*** | 1.69 | 2.05 | 2.58 | 9.40 |
| Thickness-inch | 0.08 | 0.08 | 0.083 | 0.077 |
|  |  |  | 0.080 | 0.078 |
| DM/wt | 16.9 | 18.9 | 19.91 | 27.2 |
|  |  |  | 15.37 | 20.28 |
| DS-4 minutes | 199.7 | 192.1 | 198.7 | 288 |
|  | 176.6 | 213.7 | 191.5 | 223 |
| DM | 278.3 | 295.2 | 287.5 | 454.2 |
|  | 243.7 | 298.7 | 246.5 | 398.6 |
| DS at 90 sec. | 48.3 | 36.7 | 38.5 | 47.7 |
|  | 53.9 | 43.1 | 41.3 | 43.3 |
| Afterglow | yes | no | no | no |

*Variable Height Impact Test
**ASTM D 3029
***ASTM D256

In the NBS smoke chamber, under flaming mode exposure conditions, the control compound without calcium carbonate burns with a low smoke rating, puffing out from the plane of the holder to produce a low density, friable, carbonaceous char. This char is basked in the flame fronts of 6 gas burner tips for the duration of the test. For 80 mil thick samples, this is about 10–12 minutes. When the sample is withdrawn from the smoke chamber, the char continues to burn or glow for several minutes. When the compounds containing calcium carbonate were withdrawn from the smoke chamber, there was no afterglow evident in the char. The char obtained in the compounds containing calcium carbonate had improved physical strength as compared to the char formed in compounds not containing calcium carbonate. Thus, through use of calcium carbonate, quite unexpectedly, the afterglow phenomena is eliminated, the resulting char is stronger, and the calcium carbonate has no adverse effect on the physical properties or smoke retarding characteristics of the compound. Further, and also unexpected, the use of the calcium carbonate provides compounds having a reduction in flame spread in the E-84 tunnel. It should also be noted that the amount of calcium carbonate used is critical. While the use of 30 weight parts eliminated the afterglow problem, it adversely affected the impact strength, DM/wt, DS-4 minutes and DM values.

Two other series of compounds were made in accordance with formula of the above sample, except that titanium dioxide and aluminum trihydrate were used in place of calcium carbonate. Compounds were made with 6 weight parts of titanium dioxide, and with 5 and 10 weight parts of aluminum trihydrate. In all 3 compounds, afterglow was observed in the char on samples after removal from the smoke chamber.

It is believed that the improved char obtained in accordance with this invention will improve the performance in a building or vehicle fire by providing a protective layer for material underneath. This characteristic was noted in the compounds in the flame penetration test and the full scale corner burn tests compared to a standard PVC compound. There was less involvement of the low smoke compound in the corner burn tests and the heavier gauges demonstrated a char layer that remained intact during the test providing a barrier to the wall behind. In the flame penetration test the low smoke compound provides a substantial increase in time before burn through compared to regular PVC. The improved low smoke compound shows a slight improvement in the time to a defined temperature rise. More significantly, the char layer remained in place to provide protection. Thus, the maximum temperature behind the sample is significantly reduced. The improved compound should display substantial improvements in smoke and off gases in large scale fires due to less involvement and the protective char layer.

Another important advantage of this compound is the slower rate of involvement in a fire. The maximum smoke generated in the NBS smoke chamber is reached at about 3½ minutes for typical PVC and 4½ minutes for the new low smoke compound. But in the more severe E-84 tunnel test the typical PVC reaches a maximum for the new low smoke compound at 4 minutes. The claimed compounds pass the current specifications and guidelines for the mass transit and aircraft industry. These include an NBS smoke value at 4 minutes of under 200 and at 90 seconds of under 100, and E-162 flame spread of under 35.

We claim:

1. An improved flame resistant low smoke generating vinyl halide polymer composition comprising a vinyl halide polymer, smoke retarding amounts of copper oxalate and an amine molybdate, and one to less than twenty weight parts each, per one hundred weight parts of vinyl halide polymer, of an alkaline earth metal carbonate.

2. A composition of claim 1 wherein the vinyl halide polymer is a vinyl chloride polymer, the amine molybdate is a melamine molybdate and the alkaline earth metal carbonate is calcium carbonate.

3. A composition of claim 2 wherein the polymer is polyvinyl chloride, the copper oxalate and melamine molybdate are present in amounts from about 1 to 20 total weight parts in a weight ratio of about 1:10 to about 10:1, and the calcium carbonate is present in amounts of about 3 to 15 weight parts, all based on 100 weight parts of polyvinyl chloride.

4. A composition of claim 3 wherein the total amount of copper oxalate and melamine molybdate used is a about 2 to 8 weight parts in about equal weight parts of each, and the amount of calcium carbonate used is about 5 to 10 weight parts.

5. An improved flame resistant low smoke generating vinyl chloride polymer composition comprising a vinyl chloride polymer, flame retardant amounts of copper oxalate and an amine molybdate, a processing aid selected from the group consisting of styrene copolymers and alkyl alkacrylate copolymers, an ethylene-vinyl acetate copolymer, a graft polymer of a styrene and alkyl alkacrylate onto a butadiene polymer, and one to less than twenty weight parts of an alkaline earth metal carbonate.

6. A composition of claim 5 wherein the vinyl chloride polymer is polyvinyl chloride, the styrene copolymer is a copolymer of a major proportion of styrene with acrylonitrile and the graft polymer is a graft of styrene and methyl methacrylate onto a butadiene polymer.

7. A composition of claim 5 wherein the styrene copolymer is a copolymer of a major proportion of styrene with methyl methacrylate.

8. A composition of claim 6 wherein the styrene/acrylonitrile copolymer is present in amounts of about 1 to 10 weight parts per 100 weight parts of PVC, there is about 1 to 10 total weight parts of copper oxalate and amine molybdate, 3 to 15 weight parts of the ethylene-vinyl acetate copolymer and graft polymer, and the alkaline earth metal carbonate is calcium carbonate.

9. A composition of claim 8 wherein the amine molybdate is melamine molybdate present in a ratio of 1:10 to 10:1 to copper oxalate, the ratio of ethylene vinyl acetate copolymer to the graft polymer is 2:10 to 10:2, and the calcium carbonate is present in amounts of about 3 to 15 weight parts.

10. A composition of claim 9 wherein the ethylenevinyl acetate copolymer contains about 15 to 50 weight percent copolymerized vinyl acetate and the ratio of the copolymer to graft polymer is from 4:8 to 10:2.

* * * * *